March 27, 1928.  J. OSTAND  1,663,723
AERIAL DEVICE
Filed April 18, 1927
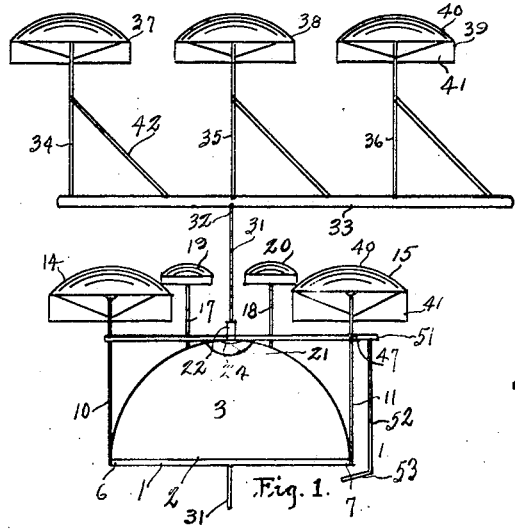
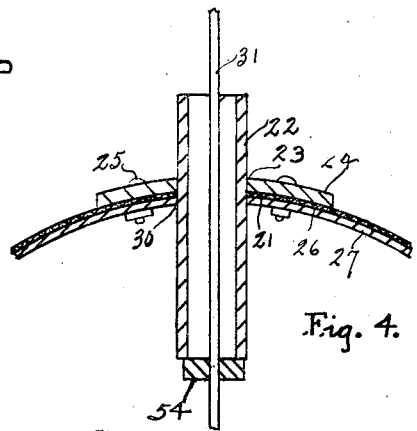
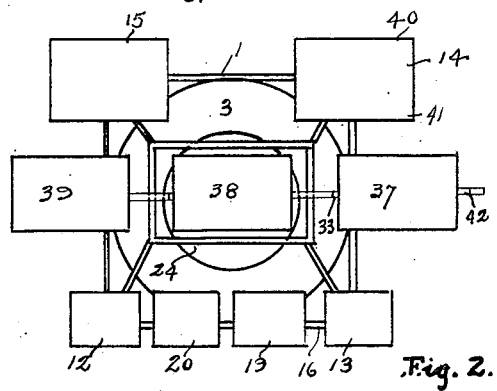
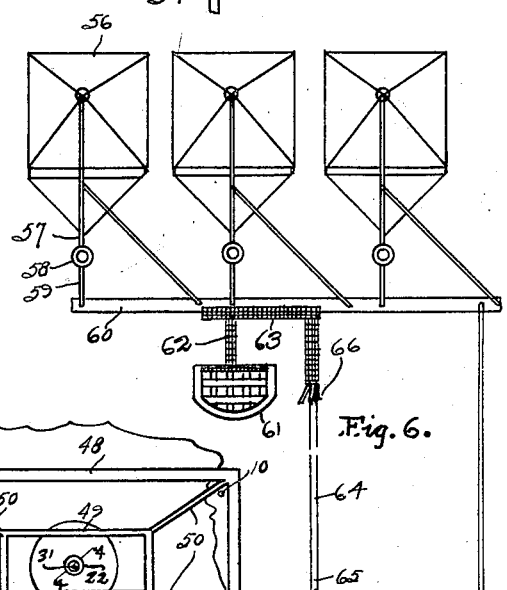
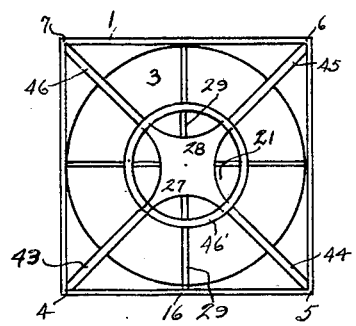
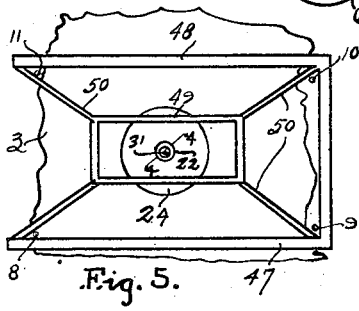
INVENTOR.
JOSEPH OSTAND
BY
ATTORNEY.

Patented Mar. 27, 1928.

1,663,723

UNITED STATES PATENT OFFICE.

JOSEPH OSTAND, OF CINCINNATI, OHIO.

AERIAL DEVICE.

Application filed April 18, 1927. Serial No. 184,579.

The invention relates to aerial navigation devices in which is utilized air buoyancy members and air power apparatus.

The objects of the invention are to provide simple, efficient, durable and practical means to effect safe navigation in the air; to provide manually operative means adapted to control the flight of said device; and to provide means whereby said device is adapted for use as an engine of war.

The invention consists in the combination of the elements, arrangement of the parts and in the details of the construction, as hereinafter specified and claimed.

In the drawings:

Fig. 1 is a side elevation of the invention;

Fig. 2 is a plan view of the same;

Fig. 3 is a bottom view of the same with the kites omitted;

Fig. 4 is a section taken on a line corresponding to 4—4 in Fig. 5, with parts removed and parts broken away;

Fig. 5 is a plan view of the controller and parachute with parts broken away; and Fig. 6 is a side elevation showing a modified form of the invention.

In the preferred construction of the invention I provide rectangular frame 1 comprising a tubular aluminum member to attain lightness of the weight thereof. The lower edge 2 of semi-spherical member or hollow parachute 3 is suitably connected to the frame 1, as shown in Figs. 1, 2 and 3. The parachute may be any thin and strong material, as rubberized canvas.

Secured to corners 4, 5, 6 and 7 of the frame 1 are lines 8, 9, 10 and 11 having connected thereto the kites, or kite-parachutes 12, 13, 14 and 15.

Secured to side 16 of the frame are spaced apart lines 17 and 18 having connected thereto the kites 19 and 20. Extending through the top 21 of the parachute 3 is tube 22 received through hole 23 in plate 24 suitably secured to the tube and to the parachute, as by bolts 25.

Suitably secured to the inner surface 26 of the parachute is the cross shape aluminum support 27 which is formed to the normal shape of the top of the parachute. The arms 27 are integral with the support 28 and extend outwardly of the parachute a distance approximately one-third of the shortest width of the support. The legs 29 are of curved formation and have their inner ends suitably secured to the top of the support 28. The outer ends of the arms are suitably secured to the frame 1, whereby the semi-spherical form of the parachute is maintained. The bolts 25 assist to retain the support in its proper position, as by being received through the plate 28 which also has hole 30 therein for receiving the tube which is suitably fixed to the plate 28. The support 27 and plate 24 are for the purpose of adequately supporting the rubberized material, of which the parachute is made, and to prevent tearing or ripping of the material when upward or downward pressure is exerted on tube 22.

Received through the tube 22 is line 31 having fixed to its upper end 32 the tube 33 having the auxiliary lines 34, 35 and 36 connected thereto. Connected to the upper ends of the lines 34, 35 and 36 are the kites 37, 38 and 39.

Each of the kites comprise a curved top 40 and flat tail 41. The frame of the kites may be aluminum covered with canvas or rubberized cloth suitably secured to the frame.

The rods 42, secured to the line 34, 35 and 36 are for the purpose of maintaining the kites separated from each other.

Secured to the corners 4, 5, 6 and 7 of frame 1 are lines 43, 44, 45 and 46 having their inner ends secured to the upper side of the seat or ring 46' upon which the operator of the invention may sit when riding in the same.

For the purpose of providing manually operative means to enable the operator to adjust the position of the kites 12, 13, 15 and 14, with respect to the parachute, the controller 47, comprising tubular outer frame 48 connected to tubular inner frame 49 by tubes 50. During the normal operation of the invention the inner frame contacts the upper surface of the plate 24, whereby the controller 47 is supported in the position shown in Figs. 1 and 5. To the end 51 of the frame 48 is fixed the control lever 52 the end 53 of which extends within access of the operator who by operating the lever 52 may move or revolve the controller 47 parallel with the frame 1 to adjust the position of the kites 12, 13, 14 and 15, the lines 8, 9, 10 and 11 of which are positioned with respect to the parts of the controller as shown in Fig. 5.

If desirable various and suitable means may be utilized to maintain the lines and the kites attached thereto separated from each other. Also, other kites may be attached to the invention above the kites 37, 38 and 39, where additional air power is required.

When it is desired to take flight, the operator seats himself upon support 46' and permits the line 31 to be drawn upwardly through the tube as by the upward movement of the kites caused by currents of air. As is well known the velocity of the currents of air elevated from the earth usually are greater than the velocity of the currents of air adjacent the earth. Therefore, the operator permits the kites 37, 38 and 39, to rise to an elevation where the velocity of the currents of air is sufficiently high to supply the required power to elevate the invention with its load. Suitable means may be provided to exert downward pressure on the frame 1 to prevent the parachute 3 from rising during the period the kites 37, 38 and 39 are permitted to rise independently of the parachute. Also, suitable means may be provided to maintain the kites 12, 13, 14, 15, 19 and 20 in the position shown in Fig. 1 during the period the kites 37, 38 and 39 are being elevated. When the kites 37, 38 and 40 are removed a sufficient distance from the parachute the line 31 is retained by the operator or it may be connected to the frame, or the stop 54, suitably fixed to the line, engages the lower end 55 of the tube, and prevents further upward movement of the upper kites 37, 38 and 39 from the parachute. The downward force then is released from the frame 1, whereby the upward force exerted on the line 31 by the kites 37, 38 and 39 causes the parachute with its load to move upwardly. The kites 12, 13, 14, 15, 19 and 20 also assist in elevating the parachute. The latter kites, however, are designed to exert insufficient upward force to elevate the parachute and its load without a predetermined upward force exerted by the kites 37, 38, and 39, whereby when the invention is floating in the air the force of the air currents exerted by the kites 37, 38 and 39 determines whether the invention ascends or descends. In other words, when the invention is in the air and the operator desires to descend he manipulates the line 31 to position the kites 37, 38, and 39 in currents of air having a low velocity.

In Fig. 6 I show a modified form of the invention to be used as an engine of war.

The kites 56 are connected by lines 57 to rings 58 which are connected by lines 59 to tubular aluminum bar 60. Suspended from the bar is container 61 connected to the frame by non-combustible material 62 having connection with combustible material 63 fixed to the bar. The material 63 is connected with fuse line 64.

When it is desired to utilize the modified form of the invention, the lower end 65 of the fuse line 64 is lighted and the device is permitted, by force exerted through kites 56, to arise from the earth. The length of the fuse line determines the period required to elapse before the fuse line burns to combustible material 66 which burns igniting material 63 permitting the container, containing explosives, to fall to the earth.

If desirable, the frame 1 may have the plurality of kites attached at the same elevation therefrom. I have experimented with a device comprising a frame having four kites attached at one end, three kites attached at the middle and two kites attached at the other end.

While I have chosen to illustrate the forms and constructions of the invention by the herein drawings and explanations of the same, it is understood that the invention resides in the combination, arrangement of the parts and in the details of the construction, as hereinafter claimed. It is further understood that changes in the precise embodiment of the invention, as disclosed herein, can be made within the scope of what is claimed without departing from the spirit of the invention, as other expedients may readily suggest themselves to the art.

What I claim as new and desire to secure by Letters Patent is:

1. In a device of the class described, a frame, a parachute having its lower edge attached to said frame, a plurality of kites attached to said frame, and a plurality of kites attached to said parachute.

2. In a device of the class described, a frame, a parachute attached to said frame, a plurality of kites attached to said frame, and a plurality of kites attached to said parachute and positioned above said last mentioned kites.

3. In a device of the class described, a rectangular frame, a parachute, a plurality of kites attached to the corners of said frame, a plurality of kites attached to the top of said parachute, and manual operative means to lower and elevate said last mentioned kites with respect to said parachute.

4. In a device of the class described, a rectangular frame, a parachute having its lower edge attached to said frame, a plurality of kites attached to the corners of said frame, a plurality of kites attached to said parachute, and a manual operative line to lower and elevate said last mentioned kites with respect to said parachute.

5. In a device of the class described, a rectangular frame, a parachute, a plurality of kites attached to the corners of said frame, a plurality of kites attached to said parachute and manual operative means to lower and elevate said last mentioned kites with respect to said parachute.

6. In a device of the class described, a rectangular frame, a parachute attached to said frame, a plurality of kites attached to the corners of said frame, a plurality of kites attached to the top of said parachute, and manual operative means to lower and elevate said last mentioned kites with respect to said parachute.

7. In an aerial navigation device, a frame, a seat connected with said frame, a parachute attached to said frame, a tube extending through the top of said parachute, means to retain said tube in said position, a plurality of kites attached to said frame and normally above said parachute, a plurality of kites normally above said last mentioned kites and a line attached to said last mentioned kites and extending through said tube whereby said last mentioned kites are adapted to be elevated and lowered with respect to said parachute.

8. In an aerial navigation device, a rectangular frame, a seat connected with said frame, a parachute having its lower edge attached to said frame, a tube extending through the top of said parachute, a plurality of kites attached to said frame and normally positioned above said parachute, a plurality of kites normally above said last mentiond kites, a line attached to said last mentioned kites and extending through said tube to said seat, whereby said last mentioned kites are adapted to be manually elevated and lowered, and a stop on said line adapted to limit the upward movement of said kites with respect to said parachute.

9. In an aerial navigation device, a frame, a parachute attached to said frame, a tube extending through the top of said parachute, a plurality of kites attached to said frame and normally above said parachute, a plurality of spaced apart kites normally above said last mentioned kites, a line attached to said kites and extending through said tube whereby said kites are adapted to be elevated and lowered, and a stop on said line adapted to limit the upward movement of said kites with respect to said parachute.

10. In an aerial navigation device, a rectangular frame, a seat connected with said frame, a parachute attached to said frame, a tube extending through the top of said parachute, a kite attached to each corner of said frame and normally positioned above said parachute, a plurality of kites normally above said last mentioned kites, a line attached to said kites and extending through said tube whereby said kites are adapted to be manually elevated and lowered, and a stop on said line adatped to engage said tube to limit the upward movement of said kites with respect to said parachute.

JOSEPH OSTAND.